Feb. 7, 1967  D. B. PURYEAR ET AL  3,302,480
FOLLOW-UP CONTROL MECHANISM
Original Filed July 9, 1962  9 Sheets-Sheet 3

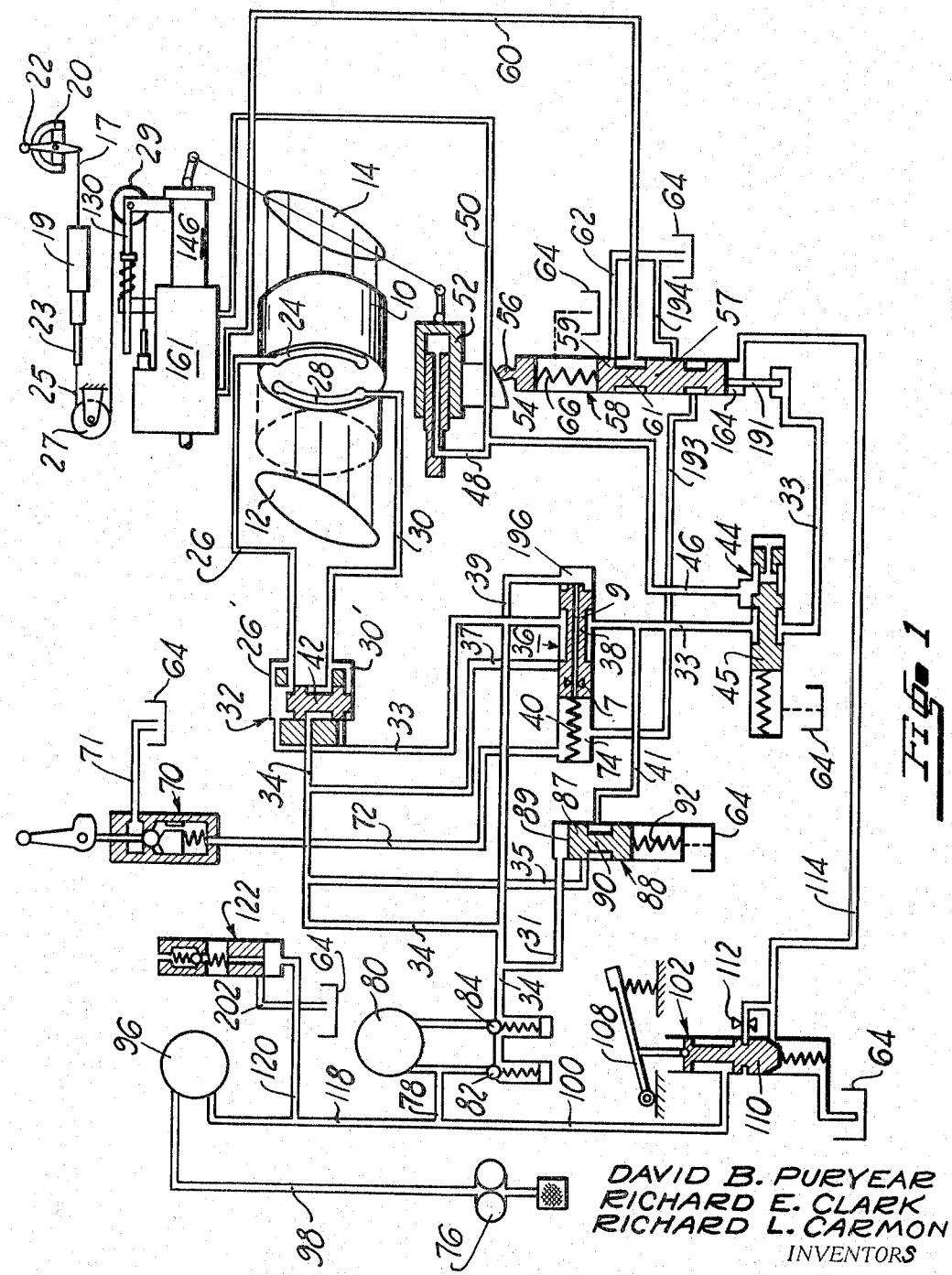

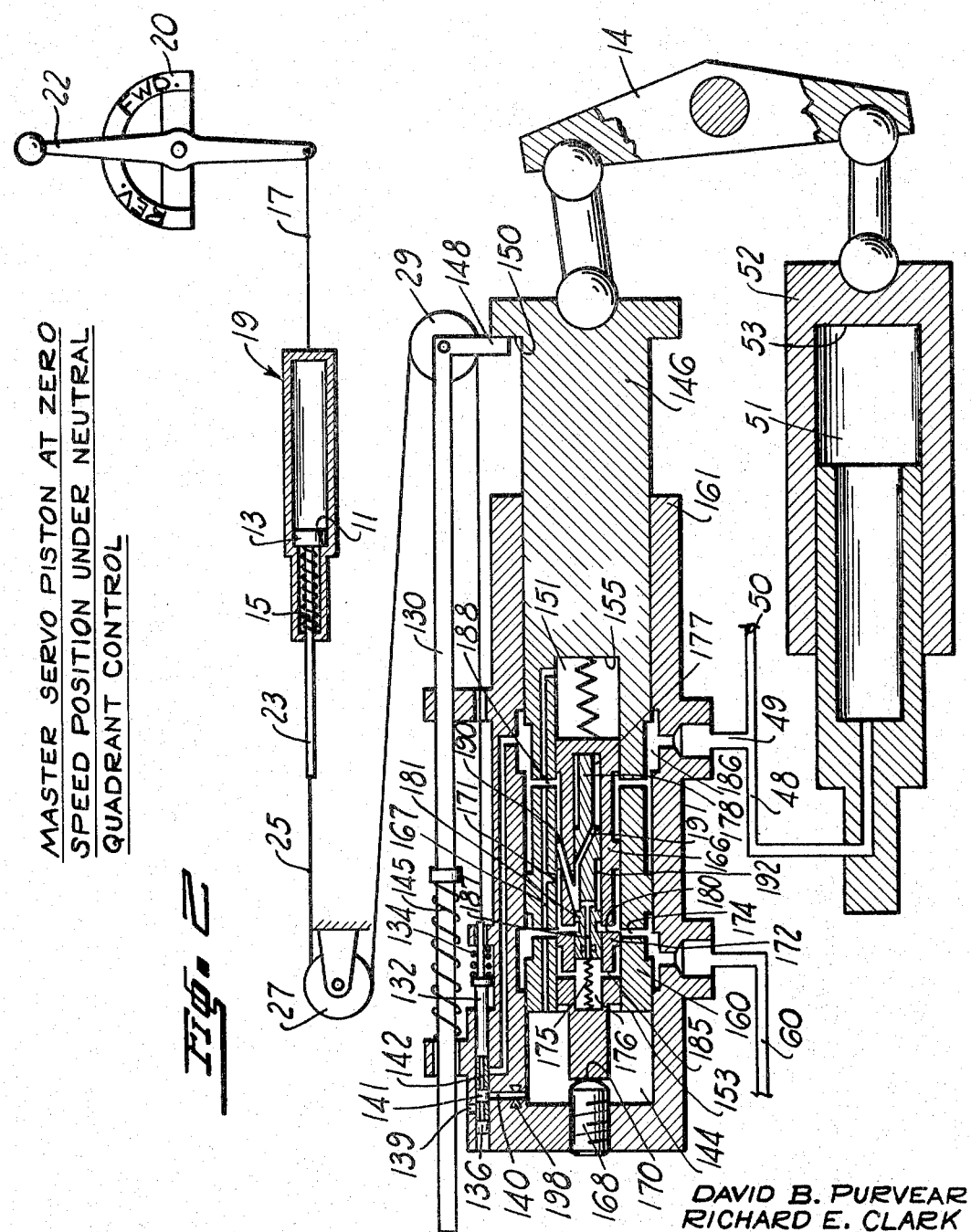

*Fig. 3A*

MASTER SERVO PISTON IN TRANSIT
TOWARD FORWARD SPEED POSITION
UNDER QUADRANT CONTROL

DAVID B. PURYEAR
RICHARD E. CLARK
RICHARD L. CARMON
INVENTORS

BY
*Gordon H. Cheng*
AGENT

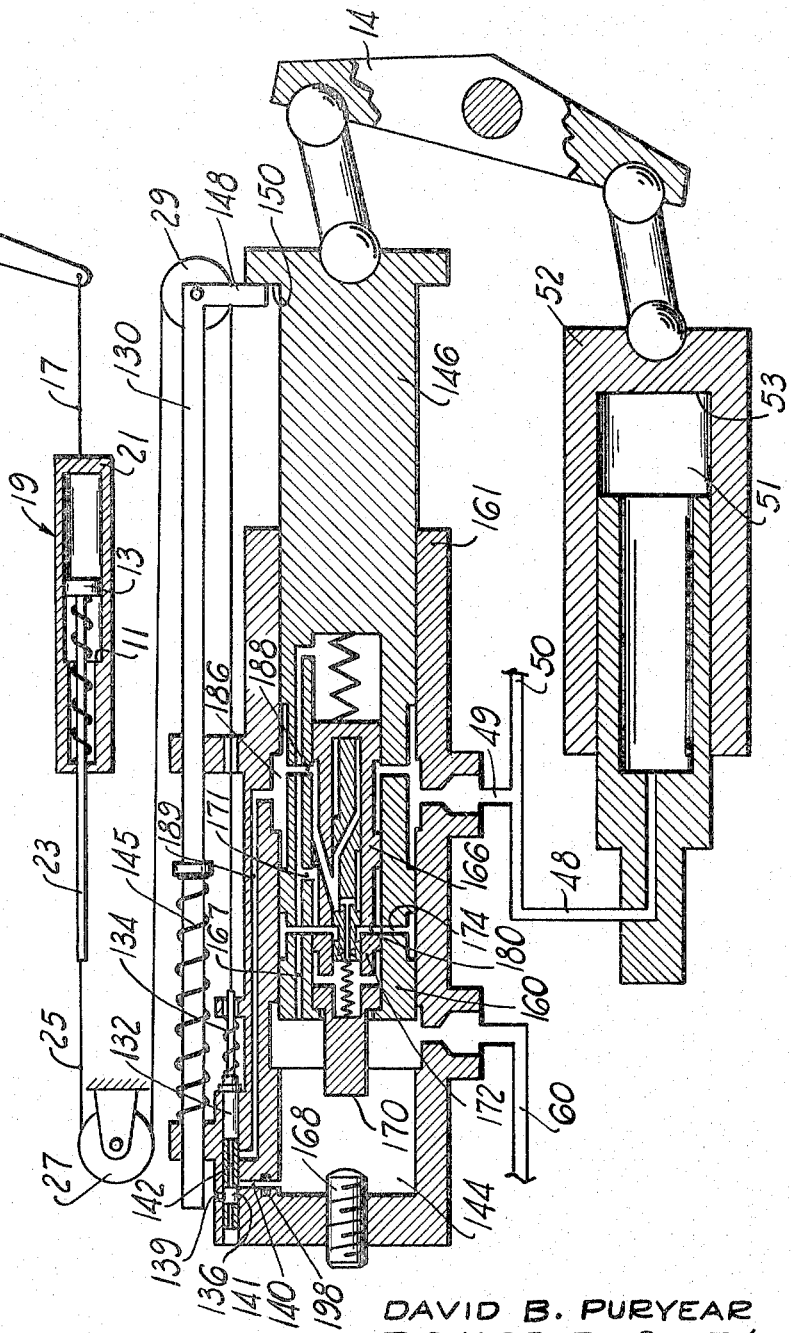

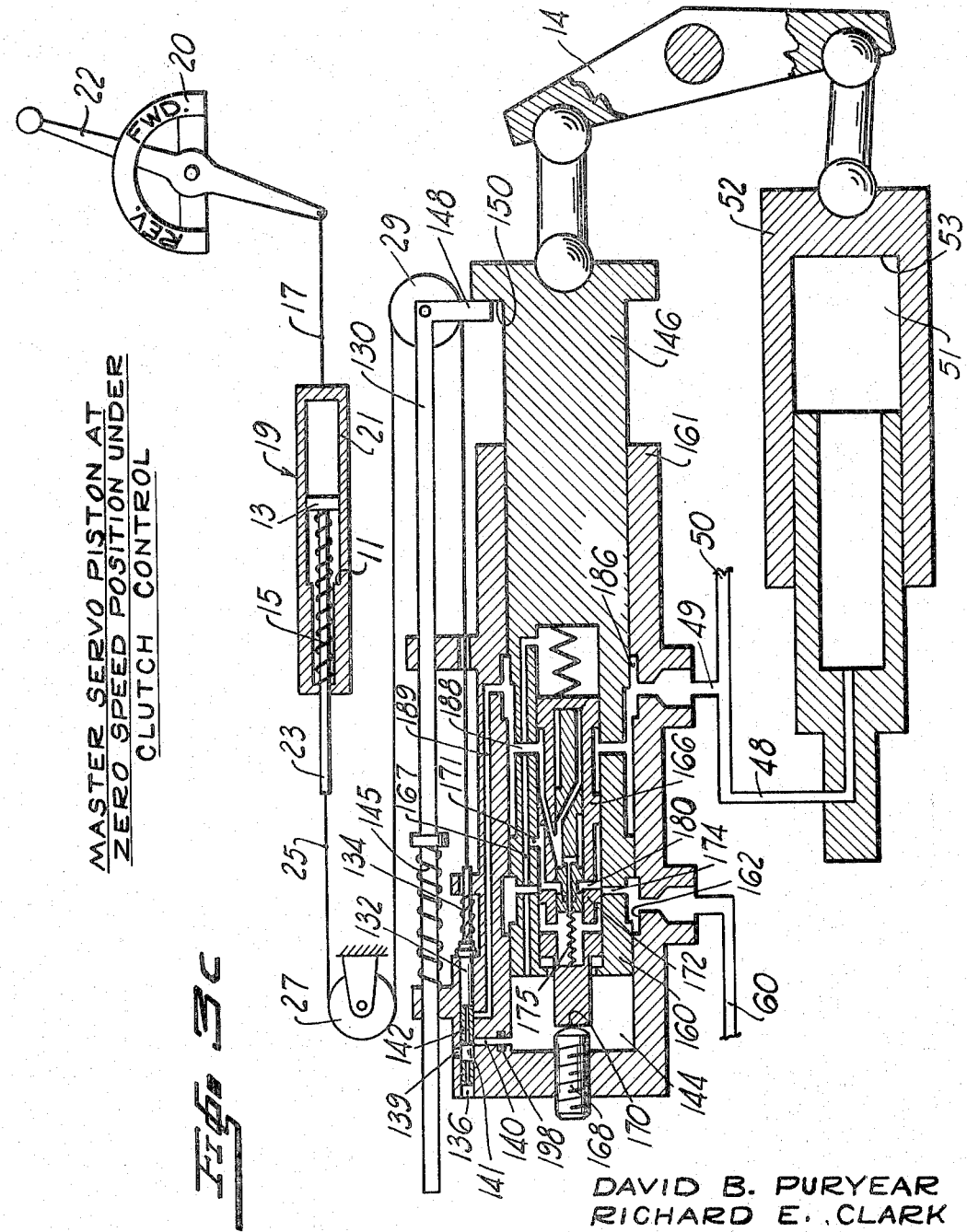

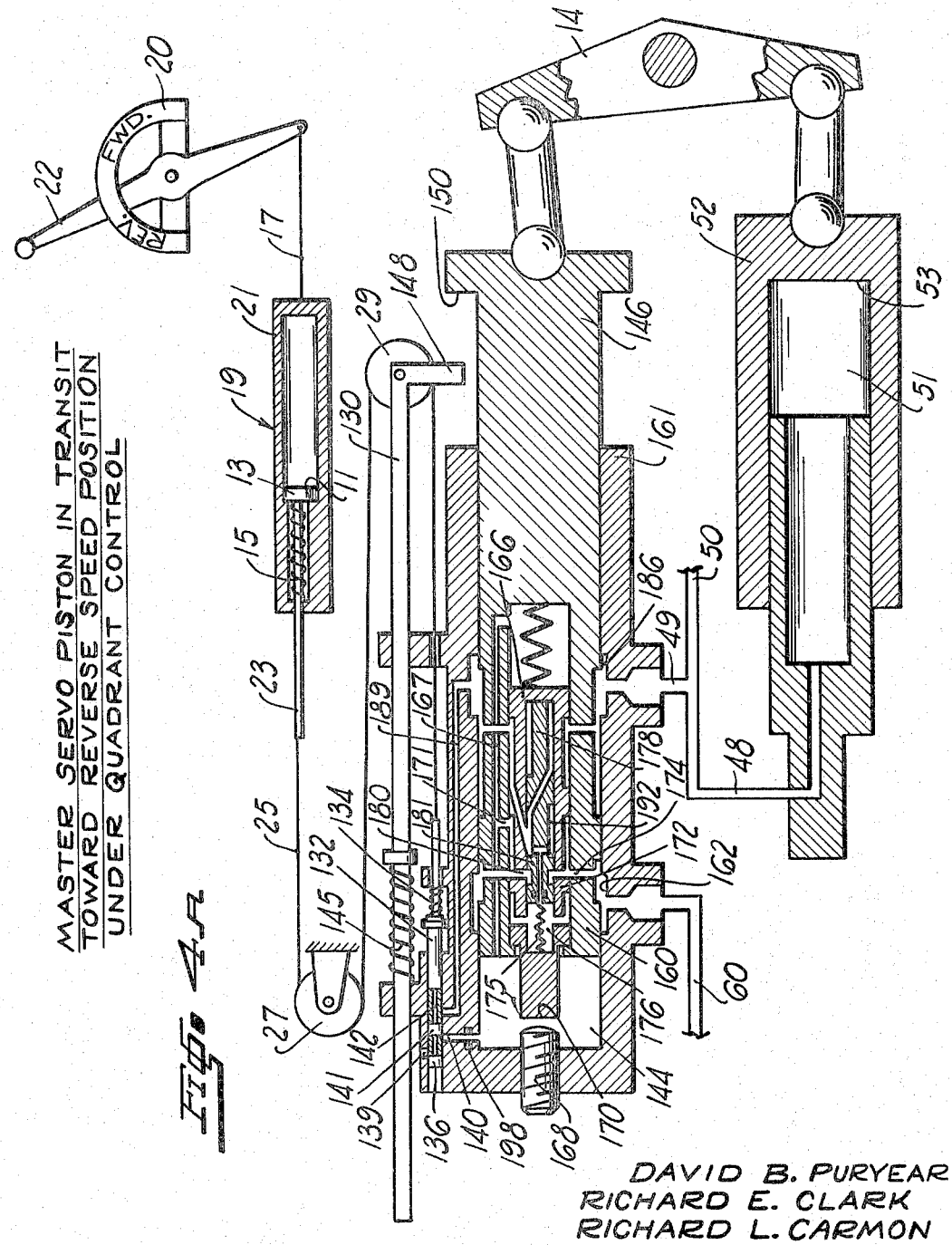

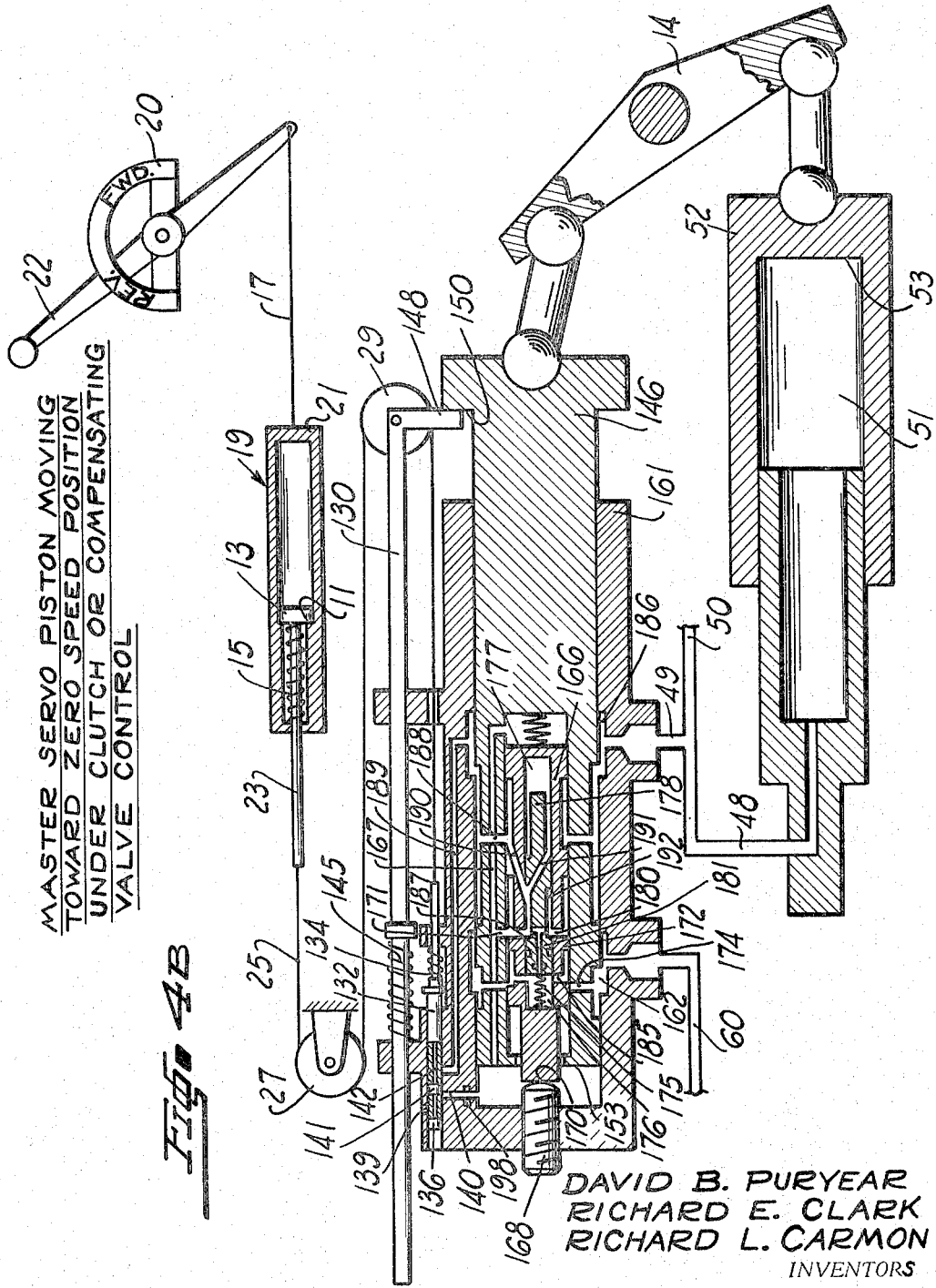

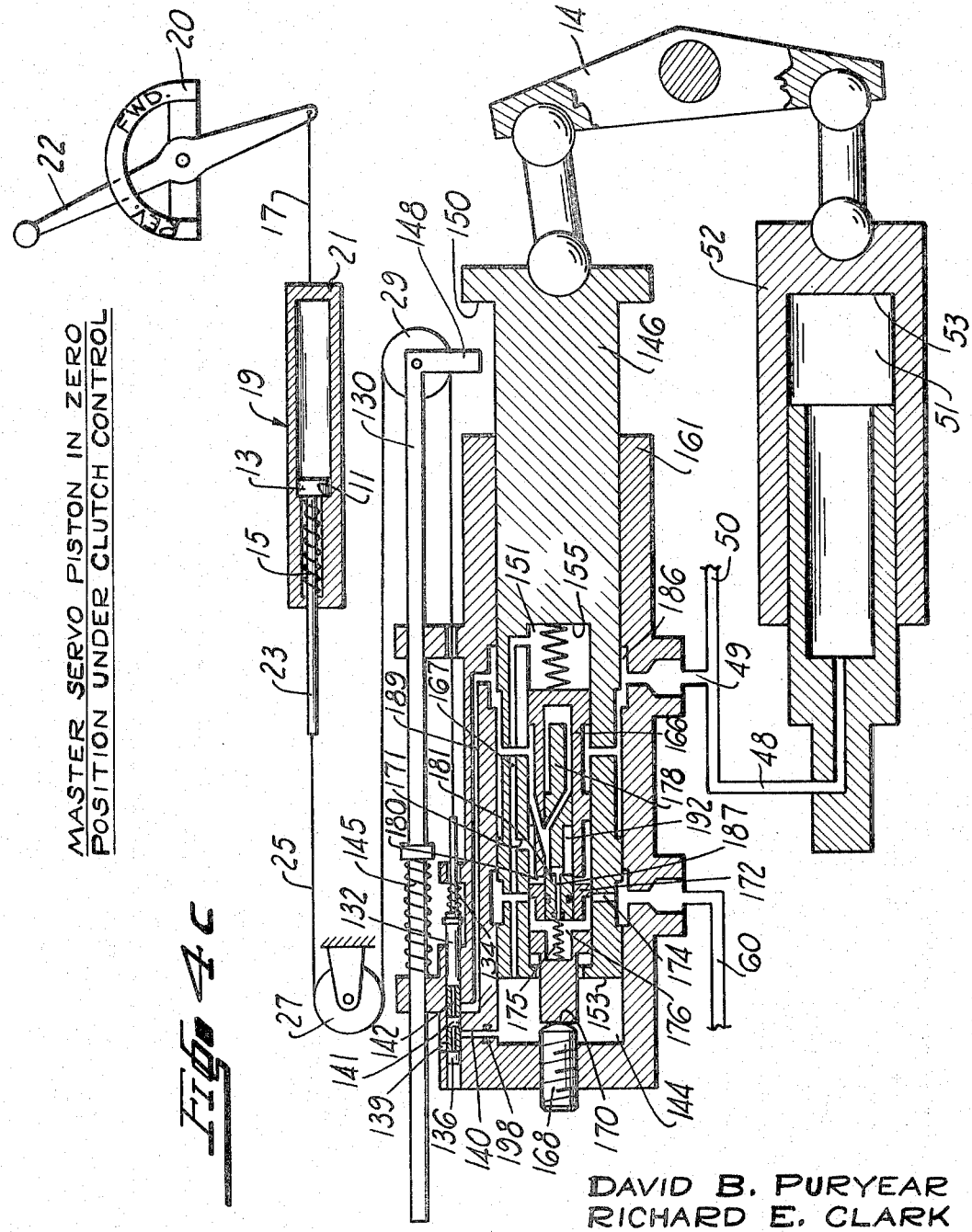

DAVID B. PURYEAR
RICHARD E. CLARK
RICHARD L. CARMON
INVENTORS

United States Patent Office 3,302,480
Patented Feb. 7, 1967

3,302,480
FOLLOW-UP CONTROL MECHANISM
David B. Puryear, Stevensville, Richard E. Clark, Ann Arbor, and Richard L. Carmon, Birmingham, Mich., assignors to The Bendix Corporation, a corporation of Delaware
Original application July 9, 1962, Ser. No. 208,437. Divided and this application Oct. 22, 1965, Ser. No. 502,247
5 Claims. (Cl. 74—501.5)

This application is a division of our copending application Serial No. 208,437 filed on July 9, 1962, and now abandoned.

This invention relates to control apparatus for actuating a controlled positionable member in response to movement of a controlling positionable member and, in particular, relates to follow-up apparatus including control cable tensioning means for transmitting relative motion between a controlling positionable member and a controlled positionable member. This invention is particularly adapted for use in controlling the hydrostatic transmission as shown and described in said copending application Serial No. 208,437.

It is an object of the preesnt invention to provide position follow-up apparatus including control cable tensioning means for eliminating undesirable control cable slack.

Still a further object of the invention is to provide a follow-up means which is capable of transmitting force from a manual operating lever to an element in the control system with the transmission of force by said follow-up means being instantaneous with the actuation of said lever regardless of the direction of actuation of the lever.

It is an object of the present invention to provide position foregoing objects by means of a simple but effective, reliable combination of controls for a hydrostatic transmission capable of driving a vehicle in reverse or forward direction and which is economically feasible to produce.

Other objects and features of the invention will become apparent from considering the following description which proceeds with reference to the accompanying drawings wherein:

FIGURE 1 is a schematic diagram view of the hydrostatic transmission hydraulic system and control system therefor embodying the present invention;

FIGURE 2 is a sectional view illustrating the master servo piston and slave cylinder piston controlling the swash plate of the pump at zero speed position under quadrant control, the lever and follow-up mechanism being shown schematically therewith;

FIGURE 3A illustrates a sectional view of the master servo piston and the slave cylinder piston moving the swash plate of the pump toward a forward speed position under quadrant control, the quadrant lever and follow-up mechanism being schematically shown therewith;

FIGURE 3B is a sectional view illustrating the master servo piston and the slave cylinder piston postions immediately following the opening of the compensating valve by clutch or compensation action while the control lever is in forward position, the quadrant lever and follow-up mechanism being schematically shown therewith;

FIGURE 3C is a sectional view illustrating the master servo piston and the slave cylinder piston maintaining the swash plate of the pump at zero speed position under clutch control with the quadrant lever in forward position, the quadrant lever and follow-up mechanism being schematically shown therewith;

FIGURE 4A is a sectional view illustrating the master servo piston and the slave cylinder piston moving the swash plate of the pump to a reverse position under quadrant control, the quadrant lever and follow-up mechanism being schematically shown therewith;

FIGURE 4B is a sectional view illustrating the master servo piston and the slave cylinder piston positions immediately following the opening of the compensating valve by clutch or compensation action while the quadrant lever is in reverse position, the quadrant lever and follow-up mechanism being schematically shown therewith;

FIGURE 4C is a sectional view illustrating the master servo piston and the slave cylinder piston maintaining the swash plate of the pump at zero speed position under clutch control with the quadrant lever in reverse position, the quadrant lever and follow-up mechanism being schematically shown therewith;

Figure 5B:
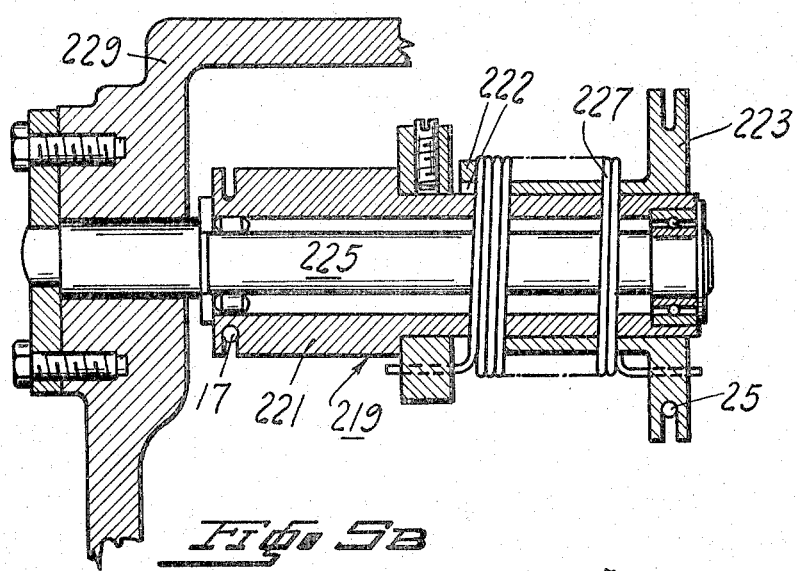
FIGURE 5B is a section view taken along line 5B—5B of FIGURE 5A.

Referring to the schematic of the transmission system illustrated in FIG. 1, a hand lever 22 is pivotally connected to a quadrant 20 and sets the rate of speed of the vehicle. The hand lever 22 acts through a follow-up mechanism 17, 19, 23, 25, 27, 29 and 130 to set the axial position of a master servo piston 146 which in turn fixes the angle of the swash plate.

Referring to FIGURES 3A–4C, a cable 17 is attached at one end to the hand lever 22 and at the other end to a take-up tensor 19 which in turn is attached to another cable 25. Cable 25 wraps around pulley 27 of a fixed rotatable axis and also wraps around pulley 29 of a movable axis of rotation before ending attached to a spring biased servo valve spool 132. A rod 130, carrying pulley 29, is slidably mounted on the fixed housing 161 of the master servo cylinder and is biased toward the right by compression spring 145. The servo valve spool 132 is biased toward the left by compression spring 134.

The take-up tensor 19 comprises an outer tubular sleeve 21 interconnected to a pin 23 slidable therein by a compression spring 15. The force of spring 145 is always greater than the combined forces of springs 134 and 15 and spring 134 is always stronger than spring 15. Assuming the lever is in any position and is moved to a forward position and locked in place, FIGURE 3A, the spring 134 will urge servo valve spool 132 to the left from closed position to forward open position and then spring 15 will take-up the resulting slack, if any, in cables 17 and 25. by spreading the sleeve and pin 21, 23 of the tensor apart. As soon as the master servo piston 146 starts moving toward the right, the spring 145 will urge rod 130 to the right thereby tensioning the cable 25 until flange 13 of slidable pin 23 engages the shoulder 11 of sleeve 21. Further movement of the rod 130 by spring 145 to the right will result in the movement of servo valve spool 132 against the force of spring 134 to the right and back to closed position due to further tensioning of cable 25. The movement of master servo piston 146 is stopped upon servo valve spool 132 reaching closed position.

If the quadrant lever 22 were moved from any position toward reverse, FIGURE 4A, the flange 13 of pin 23 will always be in engagement with the shoulder 11 of sleeve 21. The cable 25 will be tensioned moving servo valve spool 132 to the right from closed position to reverse open position and upon further movement of quadrant 22, rod 130 will be moved to the left compressing spring 145. Master servo piston 146 will move to the left until flange 150 engages the arm 148 of rod 130 and moves rod 130 to the left until compression spring 134 moves servo valve spool 132 to the left back to closed position. Movement of master servo piston 146 will then be stopped.

Figure 5C:
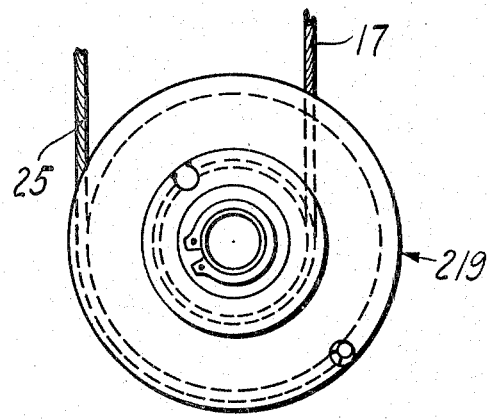
FIGURE 5C is a top view of the tensor of FIGURE 5A.
Figure 5A:
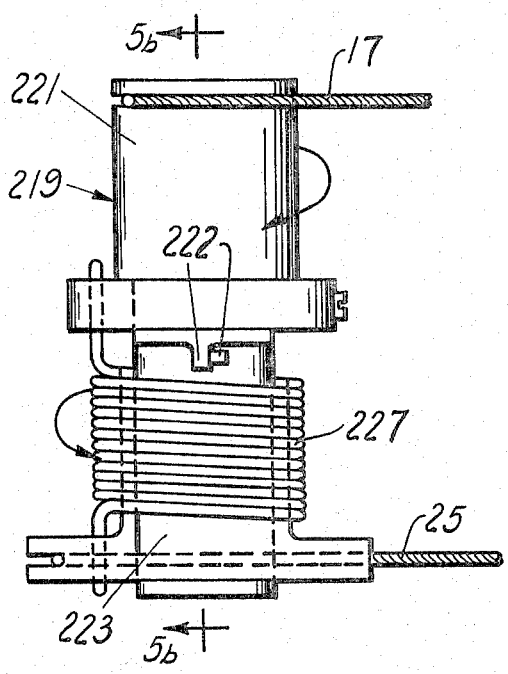
FIGURE 5A illustrates another embodiment of a tensor utilized in the follow-up mechanism.

Another type of take up tensor which could be used in place of tensor 19 is illustrated in FIGURES 5A, 5B and 5C designated as 219. The tensor comprises two hollow cylindrical members 221 and 223 rotatably mounted on a fixed longitudinal rod 225 which may be mounted to a casing 229 of the transmission. The cylindrical members 221 and 223 each have a lug 222 on the inner ends thereof which are arraged to abut each other. The lugs are biased away from each other and the cylindrical members are biased in opposite rotatable directions by a clock or coil spring 227 connected at one end to member 221 and connected at the other end to member 223. When used in place of the tensor 19, the tensor 219 will have cable 17 attached to element 221 and cable 25 will be attached to element 223. The force of spring 145 is always greater than the combined forces of springs 134 and 227 and spring 134 is always stronger than clock or coil spring 227.

When the lever 22 is moved from any position toward forward position, the spring 134 will urge servo valve spool 132 to the left from closed position to forward open position and then the clock spring 227 will rotate members 221 and 223 in opposite dierctions as shown by the arrows in FIGURE 5A separating the lugs 222 to take up the resulting slack, if any, in cables 17 and 25. As soon as the master servo piston 146 starts moving toward the right, the spring 145 will urge rod 130 to the right thereby tensioning the cable 25 and rotating element 223 against the force of the spring 227 until the lugs 222 engage each other. Further movement of the rod 130 by spring 145 to the right will result in the movement of servo valve spool 132 against the force of spring 134 to the right and back to closed position due to further tensioning of cable 25.

If the quadrant lever 22 were moved from any position toward reverse, the lugs 222 will always be in engagement with each other. With the operation of the follow-up device being the same as for the tensor 19 when the lever 22 is moved toward reverse position.

It can be seen that tensors 19 and 219 perform the same advantageous function in the follow-up mechanism by providing immediate response by the servo valve spool 132 to the position of lever 22 and at the same time maintaining the cable 25 taut so that it will be retained on pulleys 27 and 29.

It is important, that the follow-up arm 130 have a considerable range of movement, and it is further important that the rate of spring 145 be substantially constant. If it is inconvenient to supply a spring having the necessary constancy of rate over a substantial degree of travel, the spring 145 can be eliminated and hydraulic means substituted in its place for providing a constant but yieldable resistance to movement of the arm 130 toward the left and subsequent return to the right in order to restore the servo valve spool 132 to closed position when the swash plate 14 reaches an angle determined by the quadrant lever 222.

Since the position of the master servo piston 146 may be varied infinitely between limits the swash plate 14 is variable in its angular position through its total range of movement from one extreme angular position to an opposite extreme angular position. It is possible to vary the torque through correspondingly fine degrees of control from the engine to the wheels; such fine degree of adjustment being unattainable with a mechanical transmission.

*Operation of master servo piston under control of quadrant lever*

Referring to FIGURES 1–4C, a slave piston 52 has pressure from line 50 acting on face 53 which is equal to about one-half the area of faces 153 and 155 of master servo piston 146. Chambers 144 and 151 of the master servo cylinder and piston are communicated to each other through longitudinal passage 167. When the swash plate is in set position the pressure in chambers 144 and 151 is approximately equal to one-half the servo pressure in chamber 51. Servo pressure from line 50 is connected to the chamber 51 by line 48 and is connected to chamber 142 of the master cylinder housing 161 by line 49 of annular groove 186 in the housing and longitudinal passage 189. When the lever 122 is moved toward reverse speed position the servo valve spool 132 will move to the right from closed to reverse open position allowing land 141 to communicate chambers 144 and 151 through a restricted passage 140 with the port 139 leading to the reservoir. Consequently, the slave piston 151 will have a greater force biasing it to the right than master servo piston 146 has and the master servo piston 146 will move toward the left. If the lever 22 is moved toward forward position, then the servo valve spool 132 will move toward the left from closed to forward open position so land 141 will communicate chambers 144 and 151 through a restricted passage 140 with chamber 142. Since the areas 153 and 151 together are about twice as large as area 53 of slave piston 52, a slight increase of pressure to over one-half servo pressure in chambers 144 and 151 will produce more force biasing the piston 146 to the right than the force acting to the right on the slave piston 52 and therefore master servo piston 146 will move to the right. It should be understood that the master servo piston 146 will move to the left or right until it reaches its set position at which time the servo valve spool moves back to its closed position with land 141 covering passage 140 but allowing slight bleed of passage 140 to reservoir post 139 and equal bleed from chamber 142 to passage 140; the net result being no flow into or out of chambers 144 and 151.

*Clutch operation*

A clutch may be used to rapidly stop the vehicle without interference from the engine power. Gradual depression of the clutch pedal feathers pressure into the chamber 164 under the compensating valve which allows fine control of vehicle motion for implement hook-up, etc.

When the quadrant lever 22 is moved to any forward or reverse speed position on the quadrant 20 and a clutch pedal 208 is depressed, the high and low pressure kidney ports 24 and 28 are interconnected preventing transmission of torque and the pistons 52 and 146 are brought to a zero speed setting thereby returning the swash plate 14 to zero speed position; the clutch pedal control 108 over-riding the setting for the pistons 52 and 146 is provided by the quadrant lever 22. This is accomplished in a manner as shown in FIGURES 3B and 3C, wherein the quadrant lever 22 is in forward position and the land 160 communicates chamber 144 through the groove 162 to line 60. Thus, as the valve 110 is depressed by clutch 108 (FIGURE 1), the pressure from line 100 is communicated past the choke orifice 112 to line 144 and to chamber 164 thereby raising the compensating valve 58 and communicating lines 60 and 192 through lines 62 and 194, respectively, to the reservoir 64. The net effect of this sequence is to dump pressure from chamber 74 thereby permitting spool 38 to move to the left and interconnect lines 33 and 37 and to dump pressure from chamber 144 leaving an unbalance force between the slave cylinder piston 52 and the piston 146 in favor of the former. The slave cylinder piston 52 travels to the right moving the swash plate 14 to a zero speed position, carrying the piston 146 leftwardly, and at the same time moves rod 130 and pulley 128 to the left, through flange 150 and arm 148, and slackens cable 126 allowing spring 134 to move the servo valve 132 to the left. The servo pressure in line 50 will either remain the same or drop depending upon the pressure in line 33 when the high and low pressure ports are interconnected. If the pressure in line 33 drops below the normal servo pressure then the servo pressure will drop to the same value. If the pressure in line 33 drops but still remains above the normal servo pressure then the servo pressure remains at normal or its limiting value. For illustrative purposes only, it will be assumed that the servo pressure drops below normal. Land 141 of the servo valve 132 will communicate servo pressure line 50 with a restricted passage 140 and chamber 144 through groove 186, radial passage 188 of piston 146, longitudinal passage 189, and chamber 142. When the outer end 170 of spool valve 166 engages an adjustable stop 168 (FIGURE 3C) and the land 160 moves leftwardly past groove 162 to prevent access from chamber 144 directly to the groove 162, further movement of fluid out of chamber 144 must thereafter pass through passage 167 and 171 of the piston 146, radial passage 180 of piston 146, radial passage 174 of piston 146, thence to groove 162 in line 60. The piston 146 moves leftwardly until it reaches a zero speed setting (FIGURE 3C) at which time land 172 restricts passage 174 thereby restricting further fluid outlet from chamber 144 so the inflow of fluid to chamber 144 from chamber 142 and the outflow of fluid from chamber 144 is balanced. The forces on the piston 146 and slave cylinder piston 52 are then balanced with the pressure in chamber 144 being one-half servo pressure. Operation of the clutch does not of course disturb the forward speed setting of the quadrant lever 22 so that the servo valve 132 will continue to shunt fluid under pressure to chamber 144 in an attempt to restore the swash plate 14 to its forward position. When the clutch pedal 108 is released, fluid pressure will build up in chamber 40 allowing spring 40 to bias valve spool 38 into normal position to cut off the high pressure port 24 from the low pressure port 28 whereby the high pressure in line 33 will build up and servo pressure in line 50 will build up to normal. Line 114 will be communicated to the reservoir 64 enabling spring 66 to return compensating valve 58 to close line 60, thereby building up pressure in chamber 144 which produces a force acting to move piston 146 to the right which is greater than the force acting to move the slave cylinder piston 52 to the right. The piston 146 will then move toward the right restoring the swash plate 14 to its forward set position. The follow-up rod 30 has an arm 148 biased by spring 145 against flange 150 to follow the movement of master servo piston 146 to the right and upon reaching the proper set position will pull servo valve 132 to the right to closed position with land 141 closing off communication between chambers 142 and 144 and providing slight bleeding between restricted passage 140 and port 139 and between chamber 142 and restricted passage 140. The pressure in chamber 144 will then be one-half the servo pressure in the slave cylinder piston and therefore the forces acting to move pistons 146 and 52 to the right will be equalized resulting in restoring the swash plate 14 to its forward set position (FIGURE 3A).

Referring to FIGURES 4B and 4C, assuming that the quadrant lever 22 is pulled to the left to reverse position the piston 146 is in the position shown in FIGURE 4B. When the clutch pedal is operated, the servo pressure in line 50 drops to less than normal and fluid is dumped from line 60. Fluid pressure in chamber 176 drops to reservoir pressure and the small inner spool 178 is biased leftwardly under fluid pressure in chamber 177. Servo pressure is communicated through line 50, groove 186 longitudinal passage 189 to chamber 142 and is communicated through passages 188, 190 to restricted passage 187. The restricted passage 187 communicates with chamber 176, passages 185, 174, groove 162 and line 60, all of which are under zero pressure in compensating valve open position. Servo pressure is conveyed to the chamber 177 through diagonal passage 190, chamber 192, and diagonal passage 191. Servo pressure is then free to communicate from chamber 192 through radial passage 180 and radial passage 171 to longitudinal passage 167 and into chamber 144 building up the pressure in chamber 144 to slightly higher than one-half servo pressure thereby causing an unbalance of forces which results in biasing the piston 146 toward the right and moving the swash plate 14 to a zero speed setting and overriding the position of the swash plate dictated by the reverse speed setting of the quadrant lever 22. As the piston 146 moves toward the right from the position shown in FIGURE 4B to zero speed position shown in FIGURE 4C, the land 172 will come into line contact with the radial passage 174 thereby throttling communication of chamber 176 with passage 174 and bleed line 60. The pressure communicated to chamber 176 through restricted passage 187 of inner spool 178 builds up to slightly less than servo pressure and the pressure within chamber 176 and spring 175 act on the end of the inner spool 178 against the servo pressure acting on the opposite end of the spool 178 to move the spool toward the right wherein the servo pressure from chamber 192 is throttled at radial passage 180 by land 181 of spool 178 resulting in a drop in pressure in chamber 144 to a pressure of approximately one-half servo pressure. The degree of throttling fluid is balanced against the loss of fluid from chamber 144 through restriction 198 and past land 141 to the reservoir, the control valve 132 having been drawn to the right of its closed position when the spring 145 moved follow-up rod 130 to the right in an attempt to follow flange 150. When the clutch is released, the compensating valve 58 returns to close off line 60 from the reservoir line 62 and pressure builds up to servo pressure in chamber 176 wherein the pressure exerted on each end of the inner spool 178 is equal, resulting in the spring 175 pushing the inner spool 178 to the right against the end of the outer spool 166 thereby cutting off communication of servo pressure with the chamber 144. The servo pressure will act to move slave cylinder piston 52 to the right until flange 150 strikes follow-up arm 148 thereby slackening cable 126 which permits spring 134 to move servo valve spool 132 to the left and back to neutral position with land 141 covering passage 140 and disestablishing all but a very slight leakage communication of the chamber 144 with port 139, leading to the reservoir. The swash plate 14 is now back in its reverse position dictated by the quadrant lever 22 setting (FIGURE 4A).

Stop 168 is adjustable by reason of its connection to the housing 161 and can therefore be adjusted to set outer spool 166 relative to the inner spool 178 and piston 146 to effect a zero speed setting for the valve system within master servo cylinder 161. In this manner creep of the vehicle can be avoided by simply adjusting the stop 168 until the vehicle reaches stationary condition when the clutch is actuated.

Other revisions of the invention or variations will become apparent to those skilled in the art and will suggest themselves from specific applications of the invention. It is intended that such variations and revisions of the invention as are reasonably to be expected on the part of those skilled in the art to suit individual design preference and which incorporate the herein disclosed principles will be included within the cope of the following claims as equivalents thereof.

We claim:

1. A follow-up mechanism comprising: a first flexible member, actuating means operatively connected to one end of said first flexible member, a second flexible member, a take-up tensor comprising two members, first biasing means for urging said members in opposite directions, one member of said take-up tensor being connected to the other end of said first flexible member and the other member of said take-up tensor being connected to one end of said second flexible member, an operating element connected to the other end of said second flexible member, a pulley intermediate the ends of said second flexible member, said pulley having a movable axis of rotation, second biasing means for urging said pulley for movement of its axis in one direction, third biasing means for urging said element in the opposite direction, said second biasing means being stronger than said first and third biasing means, and said third biasing means being stronger than said first biasing means.

2. The structure as recited in claim 1 wherein the two members of said take-up tensor are a tubular member and a pin having an end extending through one end of and into said tubular member, said last named ends being urged away from each other by said biasing means.

3. The structure as recited in claim 1 wherein the two members of said take-up tensor are cylindrical members, each cylindrical member having a surface constructed to abut said surface of the other cylindrical member in a certain relative position of said members, means supporting said cylindrical members for rotational movement about a common axis, said biasing means urging said cylindrical members and abutting surfaces in opposite rotational directions.

4. The structure as recited in claim 1 wherein said first and third biasing means are spring members.

5. The structure as recited in claim 1 wherein said first, second and third biasing means are spring members.

References Cited by the Examiner

UNITED STATES PATENTS

| | | | |
|---|---|---|---|
| 2,744,420 | 5/1956 | Pigford | 74—501.5 |
| 3,163,055 | 12/1964 | Jeffree | 74—501.5 |

FRED C. MATTERN, JR., *Primary Examiner.*

J. PUFFER, *Assistant Examiner.*